United States Patent [19]

Mitsuda et al.

[11] 4,224,911
[45] Sep. 30, 1980

[54] APPARATUS FOR CONTROLLING THE AMOUNT OF SECONDARY AIR FED INTO AN INTERNAL COMBUSTION ENGINE

[75] Inventors: Tadao Mitsuda; Minoru Iwata, both of Susono; Masatoshi Sugiura, Obu, all of Japan

[73] Assignee: Toyota Jidosha Kogyo Kabushiki Kaisha, Toyota, Japan

[21] Appl. No.: 37,751

[22] Filed: May 10, 1979

[30] Foreign Application Priority Data

May 18, 1978 [JP] Japan .............................. 53/058319

[51] Int. Cl.³ .............................................. F02B 3/00
[52] U.S. Cl. ................................... 123/589; 123/440
[58] Field of Search ...... 123/119 EC, 32 EA, 32 EE, 123/124 B; 60/276, 285

[56] References Cited

U.S. PATENT DOCUMENTS

| | | | |
|---|---|---|---|
| 3,858,561 | 6/1975 | Aono | 123/32 EA |
| 3,971,354 | 7/1976 | Lucharo et al. | 123/32 EA |
| 4,040,394 | 8/1977 | Wahl et al. | 123/32 EA |
| 4,138,979 | 2/1979 | Taplin | 123/32 EA |
| 4,166,437 | 9/1979 | Bianchi et al. | 123/119 EE |
| 4,170,769 | 10/1979 | Asano | 123/32 EE |

Primary Examiner—Charles J. Myhre
Assistant Examiner—Raymond A. Nelli
Attorney, Agent, or Firm—Kenyon & Kenyon

[57] ABSTRACT

An apparatus for controlling the amount of secondary air fed into an internal combustion engine which includes means for controlling the response speed of a secondary air flow control means in accordance with an electrical signal. This signal is generated by integrating the value of an intake air amount signal, which is generated by multiplying the rotational speed of the engine and the load of the engine, in an interval direction determined by an equivalent air-fuel ratio condition of the engine. Thus, the equivalent air-fuel ratio can be controlled with a response speed corresponding to the amount of the flow of the exhaust gas. Furthermore, excessive control of the equivalent air-fuel ratio can be prevented.

16 Claims, 17 Drawing Figures

APPARATUS FOR CONTROLLING THE AMOUNT OF SECONDARY AIR FED INTO AN INTERNAL COMBUSTION ENGINE

BACKGROUND OF THE INVENTION

The present invention relates to an apparatus for controlling the amount of secondary air fed into an intake passage or into an exhaust passage of an internal combustion engine for controlling an equivalent air-fuel ratio (if an air-fuel passage from the intake passage through exhaust passage located upstream of an air-fuel ratio sensor is defined as a working fluid passage, the equivalent air-fuel ratio is defined as a ratio of the amount of air fed into the working fluid passage to the amount of fuel fed into the working fluid passage) within a predetermined range.

In the field of this art, a method is known in which the equivalent air-fuel ratio is detected by an air-fuel ratio sensor, for example, an oxygen concentration sensor for detecting the concentration of the oxygen component in the exhaust gas, and; then, secondary air is fed into an intake passage or into an exhaust passage of an internal combustion engine according to the detected equivalent air-fuel ratio, for maintaining the equivalent air-fuel ratio within a predetermined range which is near the stoichiometric air-fuel ratio, whereby the effect of purifying pollutants in a three-way catalytic converter disposed in the exhaust system is improved.

In a conventional apparatus for carrying out the above-mentioned method, the amount of secondary air to be injected into the engine is controlled by an air flow control valve disposed in a passage between an air pump and a secondary air injection mechanism. The air flow control valve is driven by an actuating pressure applied thereto through an electromagnetic valve which is adapted for switching the transmission of the actuating pressure on or off in response to an electrical signal provided from the air-fuel ratio sensor. More specifically, when a lean signal, which indicates that the equivalent air-fuel ratio is on the lean side of the stoichiometric air-fuel ratio, is provided from the air-fuel ratio sensor, a diaphragm of the air flow control valve is not actuated by the actuating pressure and is pressed by a return spring, so as to form a passage for discharging the air fed from the air pump into the atmosphere. Furthermore, when a rich signal, which indicates that the equivalent air-fuel ratio is on the rich side of the stoichiometric air-fuel ratio, is provided from the air-fuel ratio sensor, the diaphragm of the air flow control valve is actuated by the actuating pressure against the pressing force of the return spring, so as to form a passage for providing the air fed from the air pump to the secondary air injection mechanism.

The actuating pressure may be a negative pressure, such as a vacuum pressure provided from an intake manifold of the engine, or a positive pressure, such as discharge pressure of the air pump.

However, in the conventional apparatus of the above described type, the electromagnetic valve is driven corresponding to the electrical signal provided from the air-fuel ratio sensor to control the level of the actuating pressure and, then, the air flow control valve is driven in accordance with the actuating pressure to control the amount of secondary air fed into the engine. Thus, the amount of secondary air is controlled regardless of the amount of the exhaust gas flowing per unit time; in other words, regardless of the speed of the flow of the exhaust gas.

Therefore, when a rapid increase of the exhaust gas flow occurs, in other words, when the engine is rapidly accelerated, the valve controlling the amount of secondary air fed into the engine cannot respond to such changes of the engine conditions. As a result, it is very difficult to control the equivalent air-fuel ratio within the predetermined range during such transition periods.

In order to improve the response speed of the air flow control valve during transitional engine conditions, there exists a conventional method for instantly increasing or decreasing the actuating pressure applied to the air flow control valve when the level of the electrical signal is changed. However, such method sometimes causes excessive control, in other words overcontrol, of the equivalent air-fuel ratio every time the air flow control valve is switched.

SUMMARY OF THE INVENTION

It is, therefore, an object of the present invention to provide an apparatus for controlling the amount of secondary air fed into an internal combustion engine, whereby the equivalent air-fuel ratio can always be controlled within a predetermined range even when the operating condition of the engine changes.

According to the present invention, an apparatus for controlling the amount of secondary air fed into an internal combustion engine comprises: means for generating a first electrical signal having a value which indicates an equivalent air-fuel ratio condition of the engine; means for generating a second electrical signal having a value which indicates the rotational speed of the engine; means for generating a third electrical signal having a value which indicates the load of the engine; means for generating a fourth electrical signal having a value corresponding to the product of the value of the aforementioned second electrical signal and the value of the aforementioned third electrical signal; means for generating a fifth electrical signal by integrating the value of the aforementioned fourth electrical signal, the integral direction of this fifth electrical signal being determined by the value of the aforementioned first electrical signal; means for controlling the amount of secondary air to be fed into the engine in accordance with the level of an actuating pressure applied thereto, and; means for controlling the level of the actuating pressure applied to the aforementioned secondary air amount control means, in accordance with the value of the aforementioned fifth electrical signal.

The above and other related objects and features of the present invention will be apparent from the following description of the present invention with reference to the accompanying drawings, as well as from the appended claims.

DETAILED DESCRIPTION OF THE INVENTION

Figure 1:
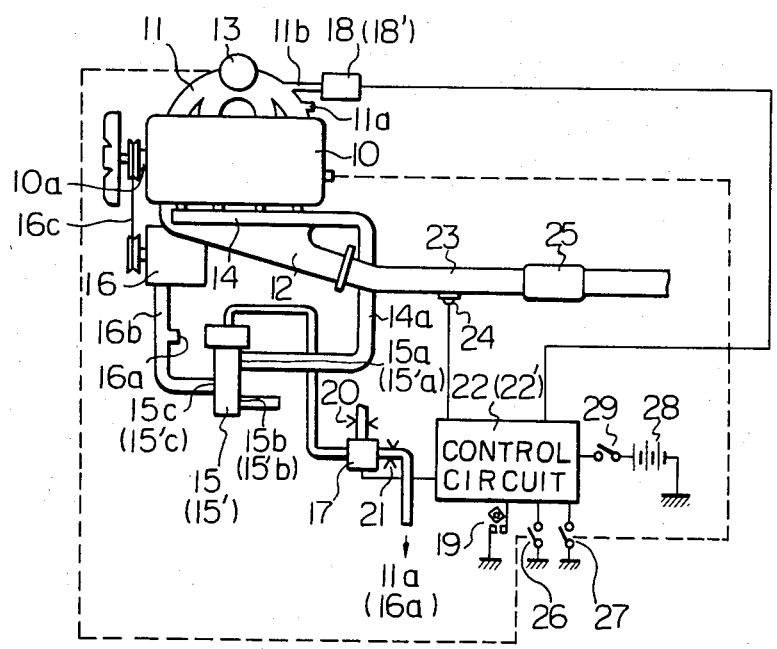
FIG. 1 is a schematic diagram of an internal combustion engine on which an apparatus for controlling the amount of secondary air according to the present invention is mounted.

Referring to FIG. 1, which is a schematic diagram of an internal combustion einge having an apparatus according to the present invention, reference numeral 10 represents the body of the engine, 11 an intake manifold of the engine 10, 11a a vacuum take-out port of the intake manifold 11 and 12 an exhaust manifold of the engine 10. A carburetor 13 having a throttle valve (not shown) is mounted on the intake passage upstream of the intake manifold 11. A secondary air manifold 14 for injecting secondary air into the exhaust manifold 12 is mounted on the exhaust port portion of the exhaust manifold 12. The secondary air manifold 14 communicates, via a conduit 14a, with a first port 15a (15a') of an air flow control valve 15 (15'), which is a diaphragm-type three-port valve. A check valve (not shown) is generally mounted on the conduit 14a. A second port 15b (15b') of the air flow control valve 15 (15') is opened to the atmosphere via, for example, an air cleaner (not shown). A third port 15c (15c') of the air flow control valve 15 (15') communicates, via a conduit 16b, with the discharge outlet of an air pump 16 which is driven by a crankshaft 10a of the engine 10 via a belt 16c. A suction inlet (not shown) of the air pump 16 is opened to the atmosphere via, for example, an air cleaner (not shown). A diaphragm chamber in the air flow control valve 15 (15') communicates with a first port of an electromagnetic valve 17 of a three-port valve. A second port of the electromagnetic valve 17 is opened to the atmosphere via an orifice 20 and preferable through an air cleaner (not shown). A third port of the electromagnetic valve 17 communicates, via an orifice 21, with the vacuum take-out port 11a or with a positive pressure take-out port 16a on the conduit 16b for feeding the discharge pressure provided from the air pump 16.

An exciting coil 17a (shown in FIGS. 4 and 6) of the electromagnetic valves 17 is electrically connected to a control circuit 22 (22'). The electromagnetic valve 17 is arranged so that when the exiciting coil thereof is energized, an actuating pressure provided from the vacuum take-out port 11a or from the discharge pressure take-out port 16a is applied to the diaphragm chamber of the air flow control valve 15 (15'), and that when the exciling coil is de-energized, atmospheric pressure is applied to the diaphragm chamber.

An exhaust pipe 23 is connected downstream of the exhaust manifold 12. An air-fuel ratio sensor 24, for example, an oxygen concentration sensor for detecting the equivalent air-fuel ratio, is mounted on the exhaust pipe 23. A three-way catalytic converter 25 for reducing the three main pollutants, i.e., $NO_x$, CO and HC components, in the exhaust gas is mounted in the exhaust pipe 23 downstream of the air-fuel ratio sensor 24. The output terminal of the air-fuel ratio sensor 24 is electrically connected to the control circuit 22 (22').

A vacuum take-out passage 11b is communicated with the intake passage downstream of the throttle valve in the carburetor 13. A vacuum level sensor 18 (18') is connected to the vacuum take-out passage 11b. The vacuum level sensor 18 (18') generates an electrical signal having a voltage level indicating the vacuum level in the intake passage downstream of the throttle valve, in other words indicating the load of the engine. The output terminal of this vacuum level sensor 18 (18') is electrically connected to the control circuit 22 (22').

One terminal of contact point 19, actuated by a breaker cam which rotates with the crankshaft 10a of the engine, is electrically connected to the control circuit 22 (22'), and the other terminal thereof is grounded.

A throttle position switch 26 is interconnected with the throttle valve in the carburetor 13 for detecting a specific position of the throttle valve where the opening degree of the valve is greater than a predetermined value. One terminal of the throttle position switch 26 is electrically connected to the control circuit 22 (22') and the other terminal of the switch 26 is grounded.

An engine temperature switch 27 is mounted on a cylinder block of the engine 10 for detecting whether or not the engine coolant temperature is less than a predetermined level. One terminal of the engine temperature switch 27 is electrically connected to the control circuit 22 (22') and the other terminal of the switch 27 is grounded. A positive side terminal of a battery 28 is electrically connected to a power input terminal of the control circuit 22 (22') through an ignition switch 29, and a negative side terminal of the battery 28 is grounded.

Figure 2A:
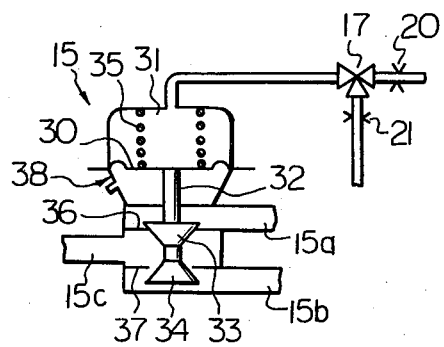
FIGS. 2a and 2b are schematic sectional diagrams illustrating two respective embodiments of an air flow control valve illustrated in FIG. 1.

FIG. 2a illustrates the structure of the air flow control valve 15 which uses vacuum pressure in the intake manifold 11 as an actuating pressure for driving the diaphragm of the valve 15 and the connection between the valve 15 and the electro-magnetic valve 17. In FIG. 2a, reference numerals 30 and 31 represent a diaphragm and a diaphragm chamber, respectively. The diaphragm 30 is connected to valve members 33 and 34 by means of a rod 32. The mid portion of the rod 32 is slidably supported by a body 38 of the air flow control valve 15. A diaphragm-return spring 35 is disposed in the chamber 31 for the purpose of pressing against the diaphragm 30. This control valve 15 is so arranged that when the pressure level in the chamber 31 is equal to the atmospheric pressure level, the valve member 33 is rested on a valve seat 36 and the valve member 34 is positioned apart from a valve seat 37, as shown in FIG. 2a.

Therefore, when the electromagnetic valve 17 is electrically de-energized, since the pressure level in the chamber 31 approaches the atmospheric pressure level, the second port 15b is communicated with the third port 15c. Contrary to this, when the valve 17 is energized, since the vacuum pressure generated in the intake manifold 11 is applied to the chamber 31, the diaphragm 30 is actuated so as to move in a direction opposite to that of the spring force caused by the return-spring 35. Thus, the valve members 33 and 34 are driven to open and to close the valve seats 36 and 37, respectively. As a result, in this case, the first port 15a is communicated with the third port 15c.

The orifices 20 and 21 are adapted for controlling the driving speed of the diaphragm 30 in cooperation with the electromagnetic valve 17, namely for controlling the speed for transmitting the actuating pressure through each of these orifices, to a desirable speed. The inner cross sections of these orifices are determined according to the response speed of the electromagnetic valve 17.

Figure 2B:
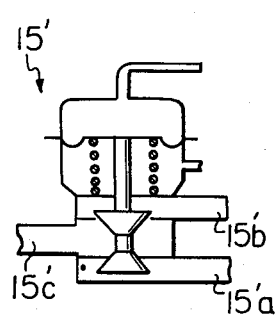

FIG. 2b illustrates the structure of another embodiment of the air flow control valve according to the present invention. This air flow control valve 15' has substantially the same function as that of the air flow control valve 15 shown in FIG. 2a, except that this control valve 15' is driven by the positive pressure, for example, the discharge pressure of the air pump 16, instead of being driven by the vacuum pressure in the intake manifold 11.

Figure 3A:
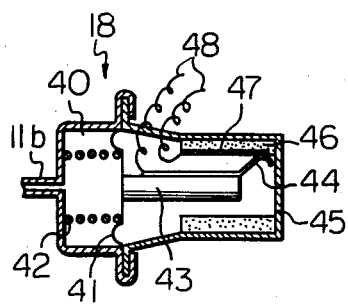
FIGS. 3a and 3b are schematic sectional diagrams illustrating two respective embodiments of a vacuum level sensor illustrated in FIG. 1.

FIG. 3a illustrates the structure of the vacuum level sensor 18 illustrated in FIG. 1. As illustrated in FIG. 3a, one end of the vacuum take-out passage 11b is opened to the intake passage at a position downstream of the throttle valve, and the other end of the passage 11b is communicated with a diaphragm chamber 40 of the vacuum level sensor 18. A diaphragm 41 for forming the diaphragm chamber 40 is pressed by a diaphragm-return spring 42 disposed in the chamber 40. In addition, the diaphragm 41 is drawn in the opposite direction against the pressing force of the spring 42, by the vacuum pressure introduced from the intake passage downstream of the throttle valve. Therefore, the diaphragm 41 and, further a rod 43 connected to the diaphragm 41 move along the axis of the rod 43 in accordance with the level of the vacuum pressure introduced into the diaphragm chamber 40. A conductor plate 44 is fixed to the rod 43. A resistor plate 47, which is composed of, for example, a resistive film formed by an well-known vacuum evaporation method, is attached, through an insulator plate 46, to a case 45 of the sensor 18. The top end of the conductor plate 44 can slidably move along the surface of the resistor plate 47, with keeping the electrical conduction between the conductor plate 44 and the resistor plate 47. Therefore, the value of the resistance between one end of the resistor plate 47 and the conductor plate 44 changes corresponding to the change of the level of vacuum pressure in the intake passage downstream of the throttle valve. In the case where lead wires 48 are connected as illustrated in FIG. 3a, if the resistor plate 47 has a uniform resistivity, the resistance value across the lead wires 48 is inversely proportional to the vacuum pressure level in the intake passage downstream of the throttle valve.

Figure 3B:
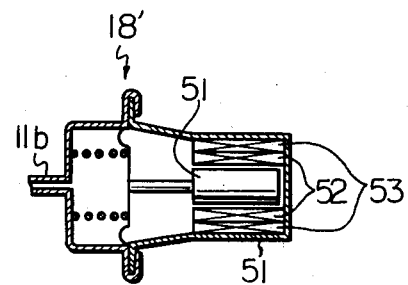

FIG. 3b illustrates the structure of another vacuum level sensor 18' illustrated in FIG. 1. The vacuum level sensor 18' has the same structure as that of the vacuum level sensor 18 illustrated in FIG. 3a, except that, in this vacuum level sensor 18', a magnetic core 50, such as a forrite core, is fixed to a rod 49, which is connected to the diaphragm in like manner as the rod 43 illustrated in FIG. 3a, and that an exciting coil 52 and a detecting coil 53 are fixed to a case 51 of the sensor 18' so as to surround the magnetic core 50. A sine wave current is applied to the exciting coil 52 from a sine wave generator, illustrated in FIG. 4, in the control circuit 22. When the magnetic core 50 moves along the coils 52 and 53, corresponding to the movement of the diaphragm, the density of the magnetic flux passing through the detecting coil 53 changes so as to cause the induced voltage appearing across the detecting coil 53 to change. The level of the induced voltage developed across the detecting coil 53 increases when the level of the vacuum pressure in the intake passage downstream of the throttle valve decreases, and vice versa. In other words, the induced voltage level of the detecting coil 53 corresponds to the load of the engine.

Figure 4A:
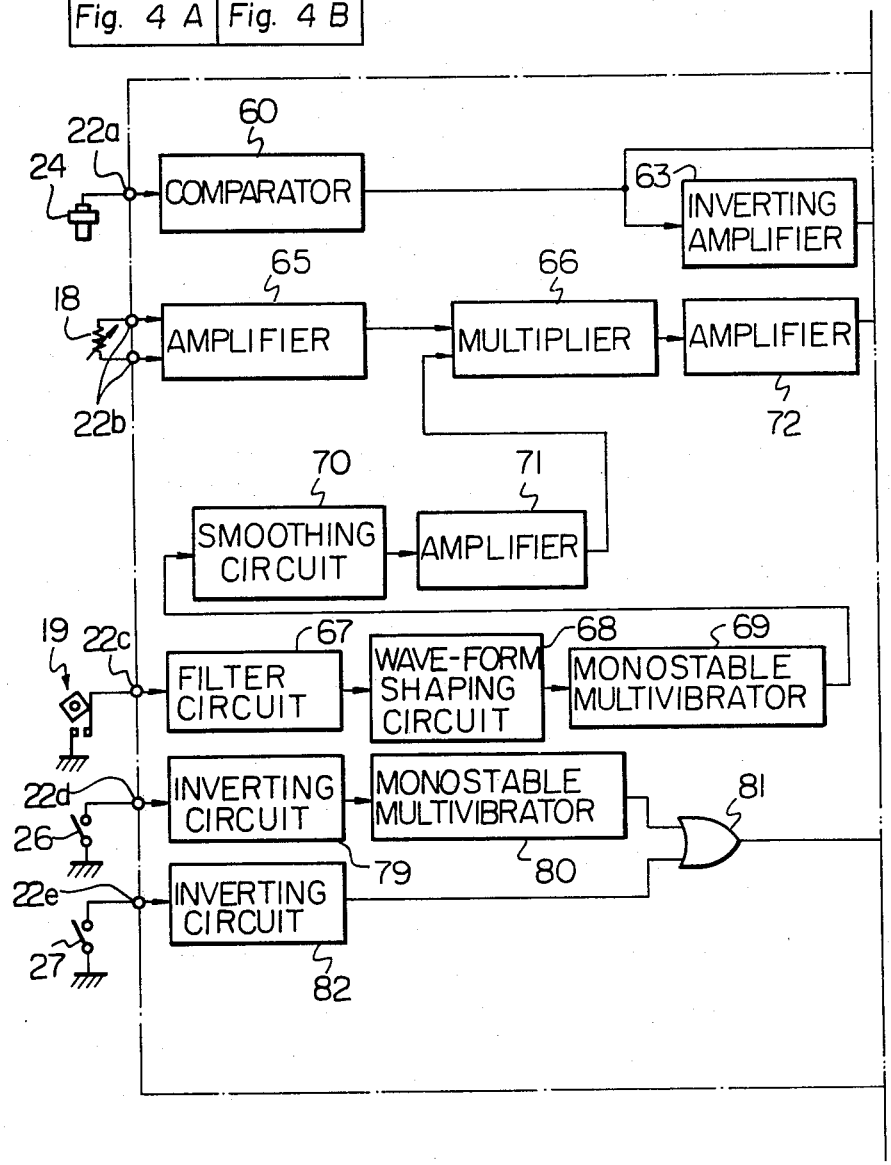
FIGS. 4a and 4b is a block diagram illustrating an embodiment of the control circuit illustrated in FIG. 1.
Figure 4B:
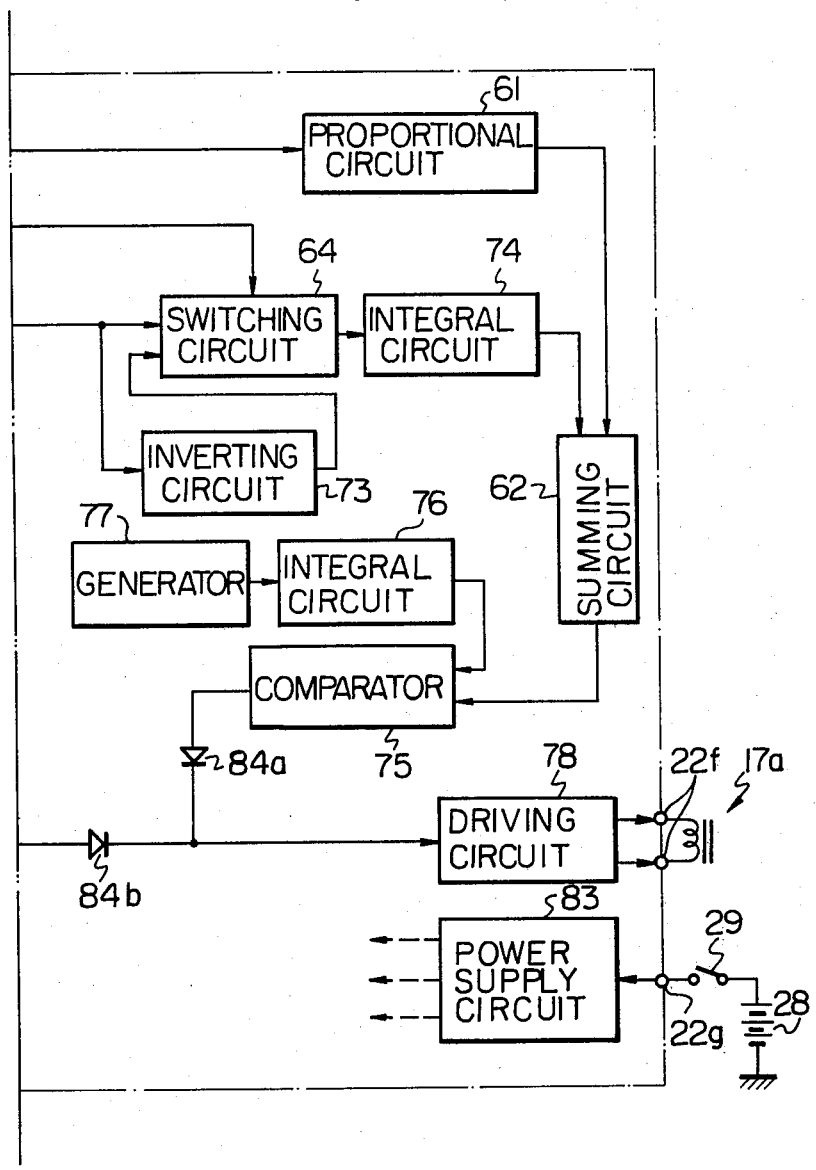

FIG. 4 is a block diagram illustrating the control circuit 22 illustrated in FIG. 1. This control circuit 22 is used in the secondary air control apparatus wherein the vacuum level sensor 18 having the structure as shown in FIG. 3a is employed. As shown in FIG. 4, the output terminal of the air-fuel ratio sensor 24 is connected to the input terminal of a first comparator 60 through the input terminal 22a. The output terminal of the comparator 60 is connected to one input terminal of a summing circuit 62 through a proportional circuit 61 and, also connected to a control input terminal of a switching circuit 64 through an inverting amplifier 63. The output terminal of the vacuum level sensor 18 is connected to one input terminal of a multiplier 66 through input terminals 22b and, furthermore, through an amplifier 65. One terminal of the contact points 19 is connected to the input terminal of a first monostable multivibrator 69 through an input terminal 22c, and furthermore, through a filter circuit 67 and a wave-form shaping circuit 68 in series. The output terminal of the first monostable multivibrator 69 is connected to the other input terminal of the multiplier 66 through a smoothing circuit 30 and an amplifier 71 in series. The output terminal of the multiplier 66 is connected to one input terminal of switching circuit 64 through an amplifier 72. The other input terminal of the switching circuit 64 is connected to the output terminal of the amplifier 72 through an inverting amplifier 73. The output terminal of the switching circuit 64 is connected to the other input terminal of the summing circuit 62 through a first integral circuit 74. The output terminal of the summing circuit 62 is connected to one input terminal of a second comparator 75. The output terminal of a rectangular wave generator 77 is connected to the other input terminal of the second comparator 75 through a second integral circuit 76. The output terminal of the comparator 75 is connected to the input terminal of a driving circuit 78 through a diode 84a. One terminal of the throttle position switch 26 is connected to the input terminal of a second monostable multivibrator 80 through an input terminal 22d and a first inverting circuit 79. The output terminal of the multivibrator 80 is connected to one input terminal of the OR circuit 81. One terminal of the engine temperature switch 27 is connected to the other input terminal of the OR circuit 81 through an input terminal 22e and a second inverting circuit 82. The output terminal of the OR circuit 81 is connected to the driving circuit 78 through a diode 84b. The output terminal of the driving circuit 78 is connected to the exciting coil 17a of the electromagnetic valve 17 through output terminals 22f.

The positive side terminal of the battery 28 is connected to the input terminal of a power supply circuit 83 through the ignition switch 29 and the power input terminal 22g. The output terminal of the power supply circuit 83 is connected to each of the power input terminals (not shown) of the above-mentioned circuits, respectively.

Figure 5A:
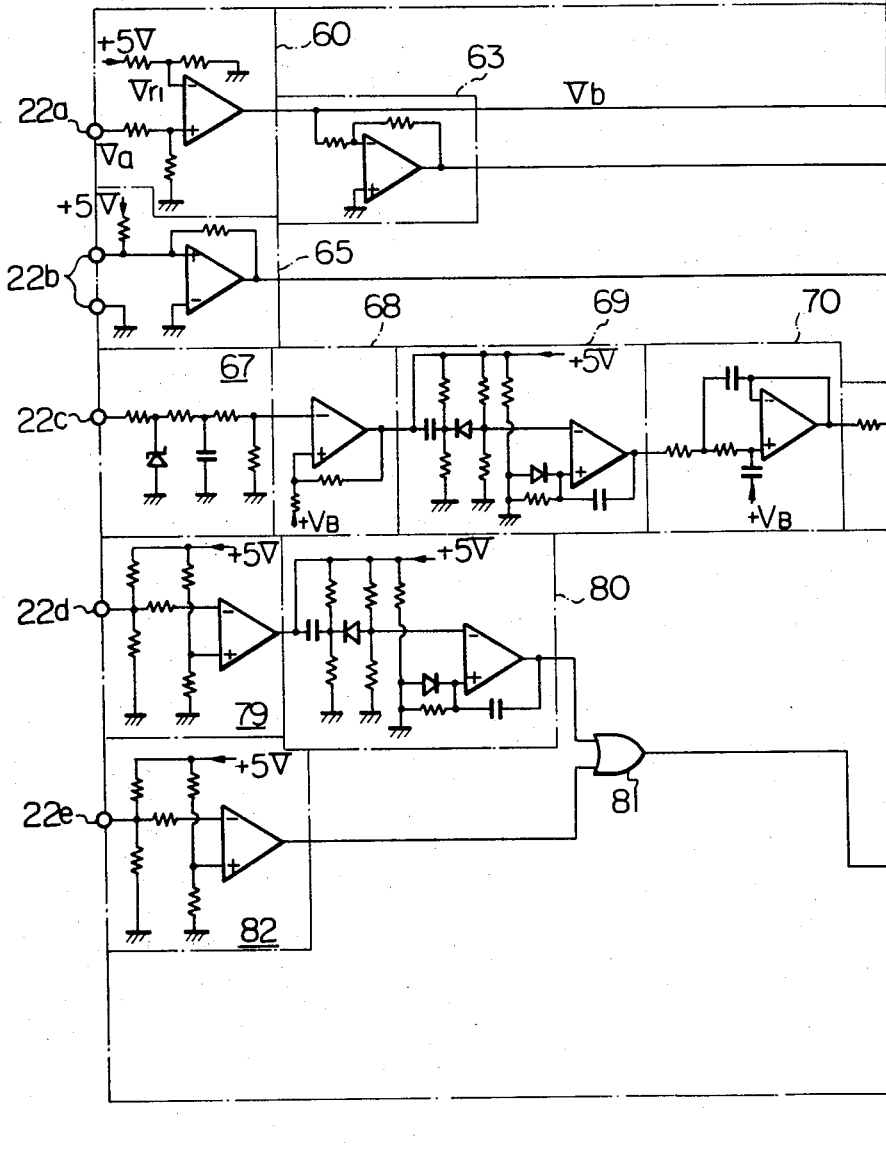
FIGS. 5a and 5b are a detailed circuit diagram of the control circuit illustrated in FIG. 4.
Figure 5B:
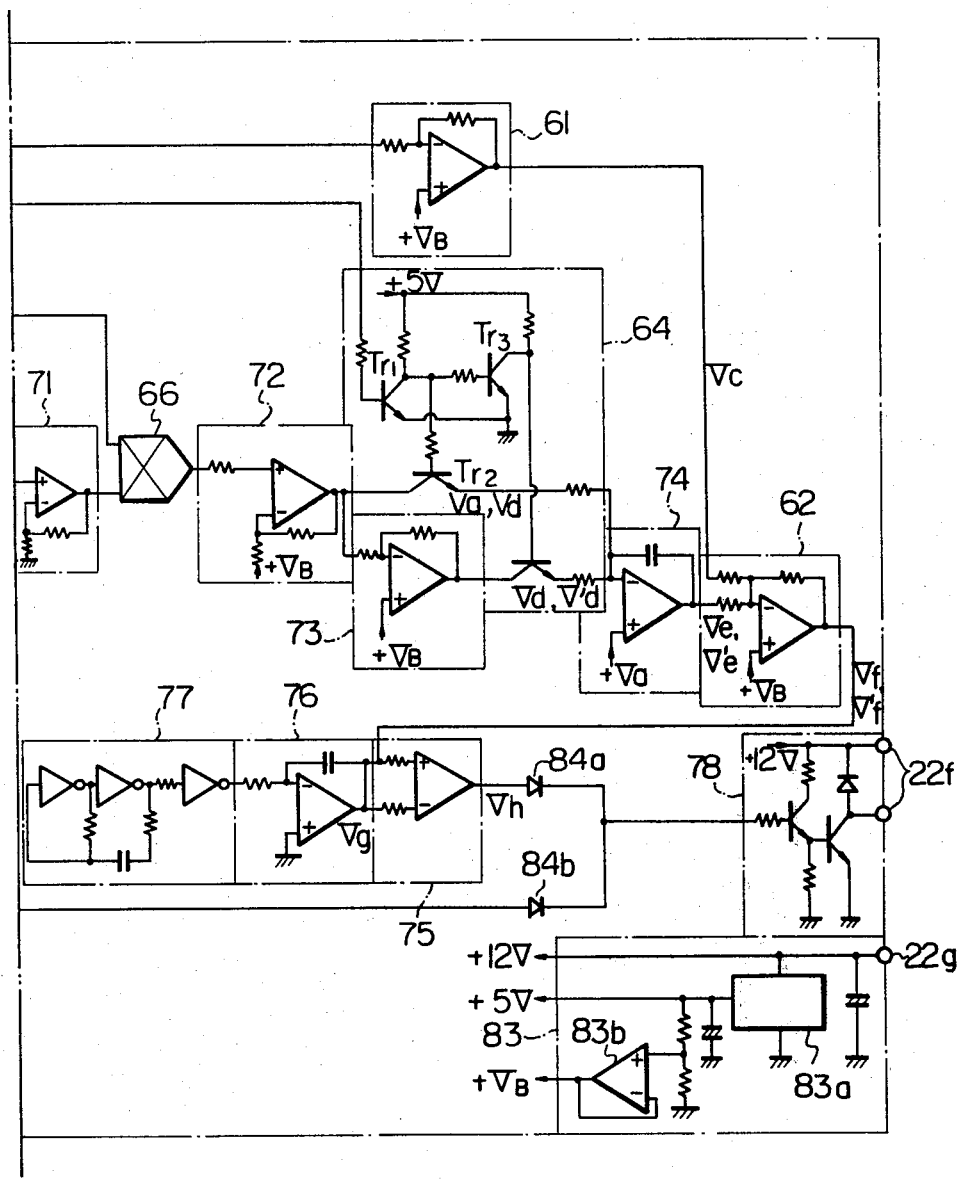

FIG. 5 is a detailed circuit diagram illustrating the control circuit 22 shown in FIG. 4. The structure and operation of the control circuit 22 will now be described in detail with reference to FIG. 5.

The first comparator 60 is composed of an operational amplifier with a non-inverting input terminal to which an input signal Va to be compared with its transmitted, and an inverting input terminal to which a reference voltage $Vr_1$ is transmitted. The level of the reference voltage $Vr_1$ is maintained at a predetermined voltage level of about 0.5 V. Therefore, when the level of the input signal Va transmitted from the air-fuel ratio sensor 24 via the input terminal 22a to the non-inverting input terminal is higher than the reference voltage level, a high level output signal appears on the output terminal thereof; and; when the level of the input signal Va is lower than the reference voltage, a low level output signal appears.

The proportional circuit 61 is a well-known inverting amplifier for generating an inverted output signal of a voltage level which is in proportion to the voltage level of the signal Vb applied from the comparator 60. As is well-known, the dividing ratio of this circuit 61 is determined by the ratio of the resistance values of an input resistor and a feedback resistor of an operational amplifier shown in FIG. 5.

The amplifier 65 is composed of a current supply circuit for supplying the vacuum level sensor 18 via the input terminals 22b with current of a constant level and an inverting amplifier for amplifying a voltage developed across the output terminals of the vacuum level sensor 18. As mentioned hereinbefore, the resistance value across the output terminals of the vacuum level sensor 18, having a structure illustrated in FIG. 3a, decreases when the vacuum level in the intake passage downstream of the throttle valve increases and contrary to this, the resistance value increases when the vacuum level decreases. Therefore, the level of the output signal from the amplifier 65 decreases when the above-mentioned vacuum level increases and increases when the vacuum level decreases.

The filter circuit 67 is formed by a combination of a clamping circuit composed of a zenor diode, and a low pass filter. The wave-form shaping circuit 68 is composed of a kind of a schmitt trigger circuit.

Each of the first and second monostable multivibrators 69 and 80 has a known circuit structure for generating a high level signal having a predetermined duration each time the level of the signal applied to the input terminal thereof is changed from a low level to a high level.

The first monostable multivibrator 69 is used to regulate the duration of the pulse signals applied from the wave-form shaping circuit 68 to a predetermined value, so as to eliminate the error occurring at the frequency-voltage conversion due to scatter in the duration of the pulse signals. On the other hand, the second monostable multivibrator 80 is used to feed a high level signal with a predetermined duration to the driving circuit 78 every time the throttle position switch 26 is opened.

The smoothing circuit 70 in this embodiment is composed of a known low pass filter having an operational amplifier. This circuit 70 generates a d.c. voltage of a level proportional to the frequency of the pulse signal (rectangular wave signal) applied from the monostable multivibrator 69. In other words, the combination of the monostable multivibrator 69 and the smoothing circuit 70 operates as a frequency-voltage converter. Therefore, these circuits can be formed by using various circuits other than the circuit shown in FIG. 5.

The multiplier 66 is a well-known analogue type multiplier.

The switching circuit 64 is constructed so as to operate as follows. When a high level voltage is applied to the control input terminal via the inverting amplifier 63, in other words, when the detected signal of the air-fuel ratio sensor 24 is a low level signal (lean signal), switching transistors $Tr_1$ and $Tr_4$ will become conductive, and switching transistors $Tr_2$ and $Tr_3$ will become non-conductive. Therefore, in this case the output signal from the amplifier 72 is applied to the first integral circuit 74 via the inverting amplifier 73. Comtrary to this, when the detected signal of the sensor 24 is a rich signal of a high level voltage and thus a low level voltage is applied to the control input terminal, the transistors $Tr_1$ and $Tr_4$ will become non-conductive, and also, the transistors $Tr_2$ and $Tr_3$ will become conductive. Therefore, in this case, the output signal from the amplifier 72 is directly applied to the first integral circuit 74. The first integral circuit 74 is a known inverting integrator having an integration reference voltage of a level of $+V_B$.

The generator 77 is a circuit for generating a rectangular wave signal, and can be formed by using various circuits other than the circuit shown in FIG. 5. The time constant of the second integral circuit 76 is selected so that it is relatively small value, so as to convert the rectangular wave from the generator 77 to a triangular wave. Therefore, the generator 77 and the integral circuit 76 can be replaced with a known triangular-wave generator.

The second comparator 75 is composed of an operational amplifier with an inverting input terminal to which the output signal from the second integral circuit 76 is applied, and a non-inverting input terminal to which the output signal from the summing circuit 62 is applied.

The driving circuit 78 is an amplifying circuit for driving the electromagnetic valve 17. When a high level signal is applied to the input terminal of the driving circuit 78, a source voltage of about 12 V is applied to the exciting coil 17a of the electromagnetic valve 17 via the output terminal 22f.

The first and second inverting circuits 79 and 82 have the same structure using a comparator. The first inverting circuit 79 generates a low level signal and a high level signal when the throttle position switch 26 opens and closes, respectively. The second inverting circuit 82 generates a low level signal and a high level signal when the engine temperature switch 27 opens and closes, respectively.

The power supply circuit 83 is arranged so as to feed the source voltage of 12 V applied from the battery 28 to the driving circuit 78 and to feed the regulated voltage of 5 V, regulated by means of a constant voltage supply circuit 83a, to the above-mentioned circuits. The power supply circuit 83, furthermore feeds the bias voltage $+V_B$ which is formed by deviding the regulated voltage to the circuits via a voltage follower circuit 83b.

Figure 8:
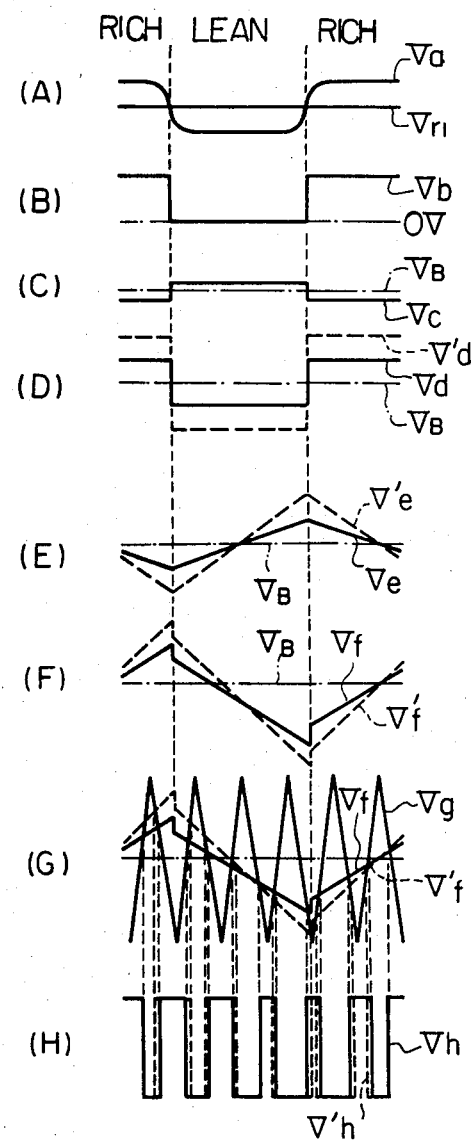
FIG. 8 is composed of waveforms obtained at various points in the control circuit illustrated in FIG. 5.
Figure 9:
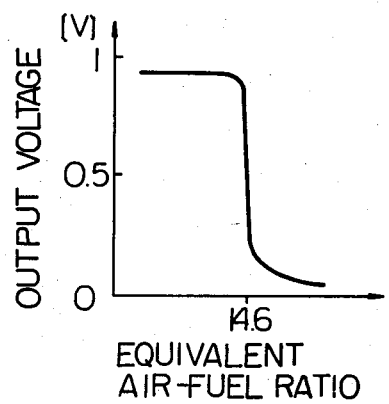
FIG. 9 is a graph illustrating the characteristics of an air-fuel ratio sensor illustrated in FIG. 1.
Figure 10:
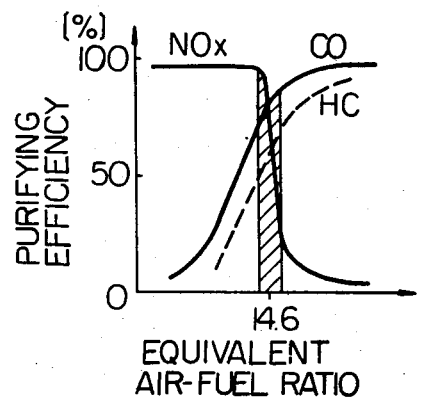
FIG. 10 is a graph illustrating the characteristics of a three-way catalytic converter illustrated in FIG. 1.
Figure 11:
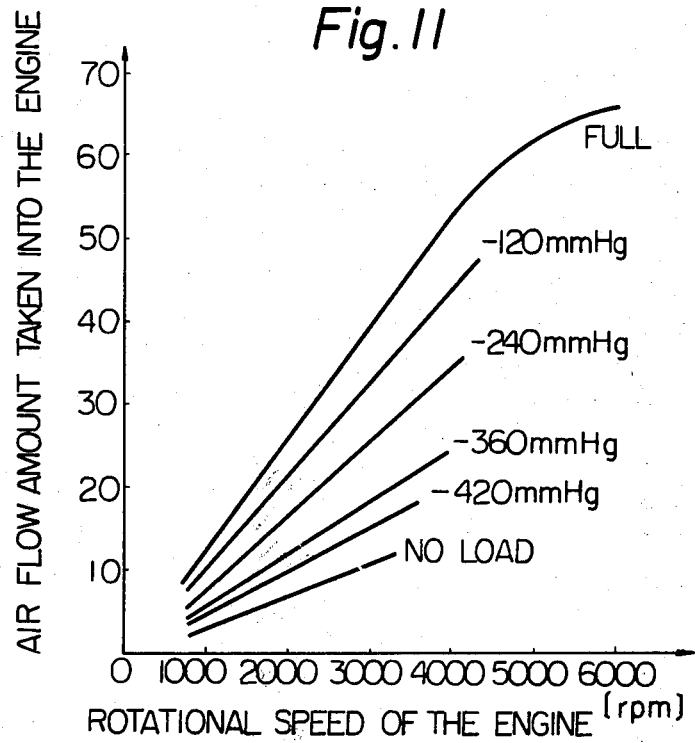
FIG. 11 is a graph illustrating the relationship between the rotational speed of the engine and the air flow amount taken into the engine.

The operation of the apparatus of this embodiment will now described, by referring FIG. 8 illustrating waveforms, FIG. 9 illustrating the characteristics of the air-fuel ratio sensor, FIG. 10 illustrating the characteristics of the three-way catalytic converter, and FIG. 11 illustrating the relationship between the votational speed and the intake air flow amount of the engine.

An air-fuel mixture measured by the carburetor 13 (shown in FIG. 1) is fed to each of cylinders (not shown) of the engine 10 via the intake manifold 11. The exhaust gas emitted from each cylinder of the engine 10 is fed to the three-way catalytic converter 25 via the exhaust manifold 12 and the exhaust pipe 23. In the catalytic converter 25, the exhaust gas is purified, and thereafter, emitted to the outside. The electromagnetic valve 17 is energized in accordance with the signals fed from the air-fuel ratio sensor 24 mounted on the exhaust pipe 23, from the contact points 19, from the vacuum level sensor, from the throttle position switch 26, and from the temperature switch 27, so as to control the level of the actuating pressure in the diaphragm chamber of the air flow control valve 15 (15'). As a result, the air flow control valve 15 (15') is actuated so as to control the amount of secondary air pushed by the air pump 16 and fed to the exhaust manifold 12.

The operation of the apparatus occurring when the engine is in a normal operating condition is first illustrated hereinafter. In this case, since the opening degree of the throttle valve is less than a predetermined value, the throttle position switch 26 is thus closed. Furthermore, since the temperature of the engine coolant is high enough, the engine temperature switch 27 is opened. Therefore, in this case, no other electrical signal is applied to the control circuit 22, except for electrical signals fed back from the air-fuel ratio sensor 24, the contact points 19, and the vacuum level sensor 18. Accordingly, the apparatus of the present embodiment is controlled only by these electrical signals provided from the air-fuel ratio sensor 24, the contact points 19 and the vacuum level sensor 18.

The air-fuel ratio sensor 24 of this embodiment is a well-known oxygen concentration sensor using zirconium oxide as an oxygen ion conductor. As shown in FIG. 9, the air-fuel ratio sensor 24 generates an output voltage of about 1 V when the equivalent air-fuel ratio is lower than the stoichiometric air-fuel ratio of 14.6, namely, when the engine is maintained on the rich side of stoichiometric conditions. Furthermore, the sensor 24 generates an output voltage of about 0.1 to 0.2 V when the equivalent air-fuel ratio is higher than the stoichiometric air-fuel ratio of 14.6, namely when the engine is maintained on the lean side of stoichiometric conditions.

As shown in FIG. 8-(A), the output voltage Va of the air-fuel ratio sensor 24 is compared with the level of the reference voltage $V_{r1}$ at the first comparator 60. Thus, as shown in FIG. 8-(B), when the rich signal, which indicates that the equivalent air-fuel ratio is on the rich side of stoichiometric conditions, is generated, the level of the output signal $V_b$ appearing at the output terminal of the comparator 60 becomes high. Contrary to this, when the lean signal, which indicates that the equivalent air-fuel ratio is on the lean side of stoichiometric conditions, is generated, the level of the output signal $V_b$ becomes low. This output signal $V_b$ is reduced and inverted to a signal $V_c$, shown in FIG. 8-(C), of an inverting level proportional to the level of the original signal $V_b$ at the proportional circuit 61 and, then, applied to one input terminal of the summing circuit 62. In FIG. 8, the reference character $V_3$ indicates the bias voltage level.

As described hereinbefore, the level of the output signal from the amplifier 65 which is connected to the vacuum level sensor 18 is almost inversely proportional to the level of the vacuum pressure in the intake passage downstream of the throttle valve. Furthermore, it is known that the level of the above-mentioned vacuum pressure is inversely proportional to the load of the engine. Therefore, the level of the output signal from the amplifier 65 is proportional to the load of the engine. This output signal from the amplifier 65 is applied to one input terminal of the multiplier 66.

The pulse signal, which is fed from the contact points 19 and has a frequency proportional to the rotational speed of the engine, is applied to the smoothing circuit 46 after shaping the wave-form and regulating the duration of time to a predetermined value, and converted to a d.c. voltage. Accordingly, the output signal of the smoothing circuit 70 and, furthermore, of the amplifier 71, has a d.c. voltage level proportional to the rotational speed of the engine. This output signal from the amplifier 71 is applied to the other input terminal of the multiplier 66.

The output signal of the multiplier 66 has a voltage level corresponding to the product of the rotational speed and the load of the engine. Since there is a relationship among the parameters indicating the engine conditions such that the product of the rotational speed of the engine and the load of the engine corresponds to the amount of air taken into the engine, the output signal of the multiplier 66 will have a voltage level corresponding to the amount of air sucked into the engine.

As described hereinbefore, since the switching circuit 64 is controlled in response to the level of the output signal $V_b$ of the comparator 60, when the rich signal is generated, the output signal of the multiplier 66 is applied to the first integral circuit 74 via the amplifier 72 without inversion. When the lean signal is generated, the output signal of the multiplier 66 is applied to the inverting amplifier 73 via the amplifier 72 so that the level of the output signal can be inverted, and thereafter, applied to the first integral circuit 74. Therefore, the input signal $V_d$ of the first integral circuit 74 is as shown in FIG. 8-(D). This signal $V_d$ is integrated at the integral circuit 74 and, then, the integrated signal $V_e$ shown in FIG. 8-(E) is applied to the other input terminal of the summing circuit 62. In the summing circuit 62, the level of the aforementioned signal $V_c$ applied from the proportional circuit 61 is added to the level of this signal $V_e$. The output signal $V_f$, which has an inverted waveform as shown in FIG. 8-(F), of the summing circuit 62 is applied to the second comparator 75 for comparing the level of the signal $V_f$ with the level of a triangle-wave signal $V_g$ formed by the generator 77 and the second integral circuit 76, as shown in FIG. 8-(G). When the level of the signal $V_f$ is higher than the level of the triangular-wave signal $V_g$, a high level signal $V_h$, shown in FIG. 8-(H), appears at the output terminal of the comparator 75. The driving circuit 78 is driven only when the high level signal $V_h$ is applied thereto, and at the same time, the exciting coil 17a of the electromagnetic valve 17 is energized.

When the electromagnetic valve 17 is energized, the actuating pressure, such as the vacuum pressure of the intake manifold 11 or the discharge pressure of the air pump 16, is applied to the diaphragm chamber of the air flow control valve 15 or 15', and accumulated therein. The duration of the high level signal $V_h$ generated by the comparator 75, namely the energizing period of the electromagnetic valve 17, is comparatively short when the output signal of the air-fuel ratio sensor 24 changes from a lean signal to a rich signal, and then, becomes gradually longer as time proceeds. Therefore, the longer the rich signal is maintained, the more rapidly the air flow control valve 15 (15') is actuated. As a result, the amount of secondary air pushed by the air pump 16 and injected into the exhaust manifold 12 is small at first when the output signal of the air-fuel ratio sensor 24 changes from the lean signal to the rich signal, and then becomes gradually larger as time proceeds.

When the output signal of the air-fuel ratio sensor 24 changes from the rich signal to the lean signal, the energizing period of the valve 17 is comparatively long at first, and then, becomes gradually shorter as time proceeds. Therefore, the amount of secondary air injected into the exhaust manifold 12 is large at first when the signal changes from rich to lean and, then, becomes less as time proceeds.

As described above, according to the present embodiment, since the equivalent air-fuel ratio is not rapidly controlled when the level of the output signal of the air-fuel ratio sensor 24 changes, excessive control of the equivalent air-fuel ratio can be prevented. Therefore, the equivalent air-fuel ratio can be more precisely controlled without causing the over-control phenomenon.

When the amount of air sucked into the engine is increased, since the product of the rotational speed and the load of the engine is increased in accordance with the intake air amount, the level of the input signal applied to the integral circuit 74 becomes large, as shown by $V_d'$ in FIG. 8(D). Therefore, the slope of the waveform of the output signal of the integral circuit becomes greater, as shown by $V_e'$ in FIG. 8(E), and thereby the speed of change in the duration of the high level signal generated by the comparator 75 is also increased, as shown by $V_h'$ in FIG. 8-(H). As a result, the response speed of the air flow control valve 15 (15') increases, so that the amount of secondary air fed into the engine can be quickly increased or decreased.

Therefore, the equivalent air-fuel ratio can be quickly controlled.

It is well-known that there is a relationship among the amount of fuel taken into the engine, the rotational speed of the engine, and the load of the engine, as shown in FIG. 11. Namely, according to FIG. 11, wherein the level of the load of the engine is represented by the level of the vacuum pressure in the intake passage down stream of the throttle valve, it is apparent that the amount of fuel taken into the engine is proportional to the product of the rotational speed level of the engine and the load level of the engine.

Furthermore, according to the present embodiment, a partial level of the rich signal is added to the level of the integrated signal $V_e$ ($V_e'$) so as to instantly increase the duration of the high level signal $V_h$ ($V_h'$) for energizing the electromagnetic valve 17 by a certain amount. Therefore, the actuating pressure is rapidly applied into the diaphragm chamber of the air flow control valve 15 (15'), and the valve 15 (15') is thereby driven without delay.

When the opening degree of the throttle valve exceeds the predetermined value due to, for example, the rapid acceleration of the engine, the throttle position switch 26 is opened to cause the second monostable multivibrator 80 to be triggered and to produce a high level signal with a predetermined duration. The driving circuit 78 is actuated by the high level signal produced by the multivibrator 80 to energize the electromagnetic valve 17. As a result, secondary air is rapidly injected into the exhaust manifold 12 in the same manner as in the above-mentioned case. Namely, even if the operating degree of the throttle valve exceeds the predetermined value and the air-fuel ratio of the air-fuel mixture fed into the cylinder of the engines is rapidly changed to be on the rich side of the stoichiometric air-fuel ration, the equivalent air-fuel ratio will be controlled within the predetermined range without any delay.

Accordingly, the three-way catalytic converter 25 mounted on the exhaust pipe 23 can be used to effectively purify the pollutants, not only when the engine is normally operated, but also when the engine is rapidly accelerated. This is because the three-way catalytic converter has operating characteristics as shown in FIG. 10, which illustrates the relationship between the purifying efficiency of the three-way catalytic converter and the equivalent air-fuel ratio. As shown in FIG. 10, the three-way catalytic converter can attain the highest efficiency in simultaneously purifying the three main harmful pollutants in the exhaust gas when the equivalent air-fuel ratio is within a very narrow range (shown as the hatched zone in FIG. 10) which is near the stoichiometric air-fuel ratio.

The operation of the apparatus of the present embodiment occurring when the temperature of the engine coolant is lower than a predetermined value, for example, 50° C., and occurring when the engine temperature switch 27 is closed is now illustrated. In this case, since a low level signal is applied to the inverting circuit 82, the level of the output voltage of the inverting circuit 82 is maintained at a high level. As a result, the driving circuit 78 is actuated to energize the electromagnetic valve 17. Therefore, in this case, secondary air is injected into the exhaust manifold 12 in the same manner as described above. When the temperature of the coolant exceeds the predetermined value, the engine temperature switch 27 is opened and the operation of injecting secondary air into the engine in response to the temperature of the coolant is stopped. Thereafter, control of the secondary air injection is performed in accordance with the signals generated from the air-fuel ratio sensor 24, from the vacuum level sensor 18, from the contact points 19 and from the throttle position switch 26. As described above, the present apparatus is arranged so that when the engine temperature is low, the equivalent air-fuel ratio is forcibly controlled as that it is on the lean side by injecting secondary air into the exhaust gas. Accordingly, in this case, the three-way catalytic converter acts as an oxidation catalytic converter, and the CO and HC components in the exhaust gas are thereby effectively reduced. This is because, when the engine temperature is low, since the air-fuel ratio sensor is inactive, the air-fuel feedback control based on the signal generated from the air-fuel ratio sensor cannot be performed. Furthermore, in this case, the temperature of the catalytic converter is low and the amount of the $NO_x$ component contained in the exhaust gas is very small.

Figure 6A:
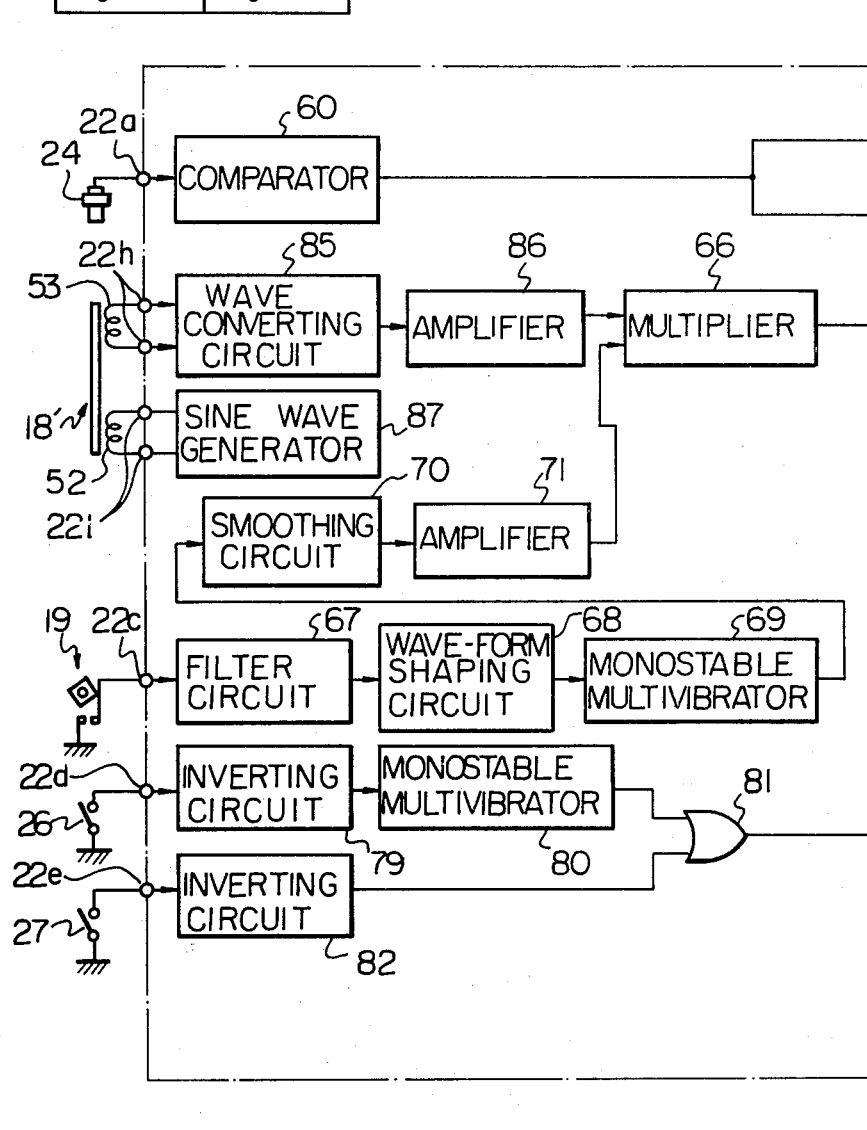
FIGS. 6a and 6b are a block diagram illustrating another embodiment of the control circuit illustrated in FIG. 1.
Figure 6B:
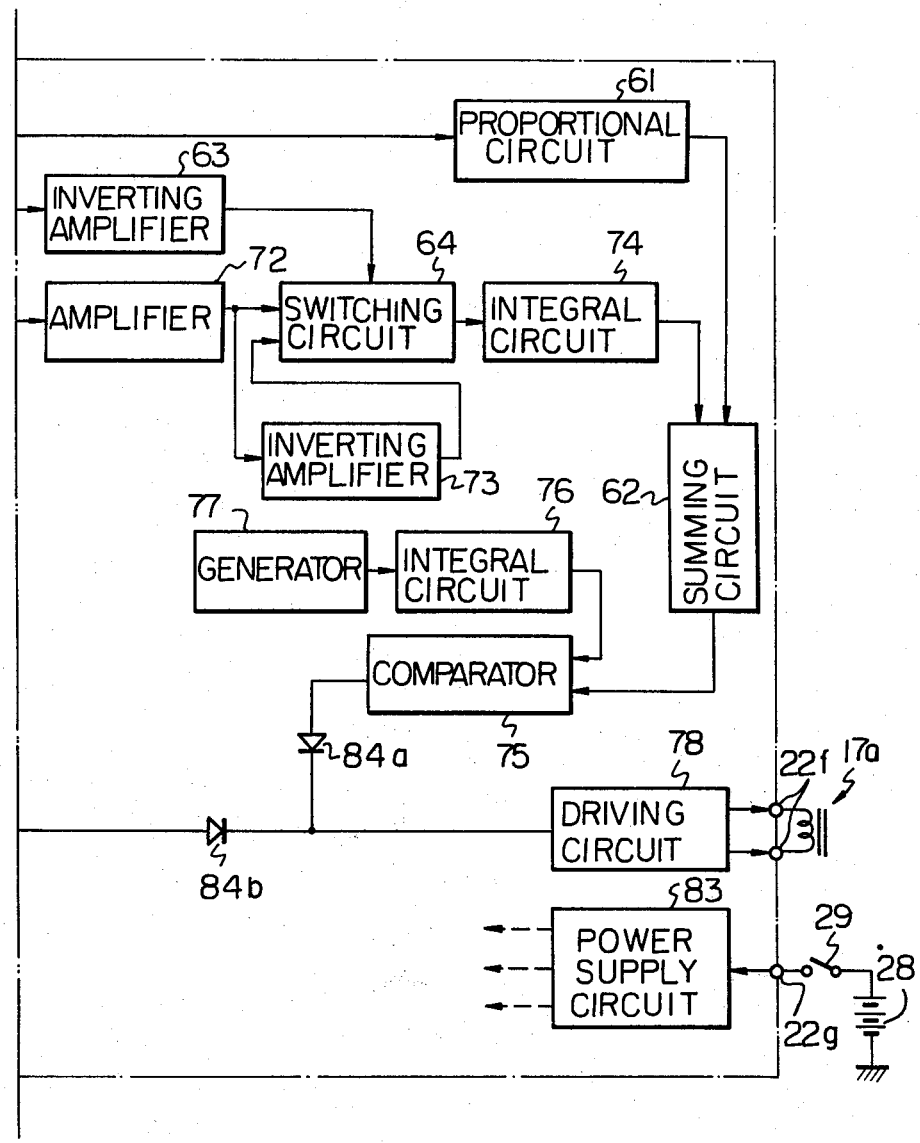
Figure 7A:
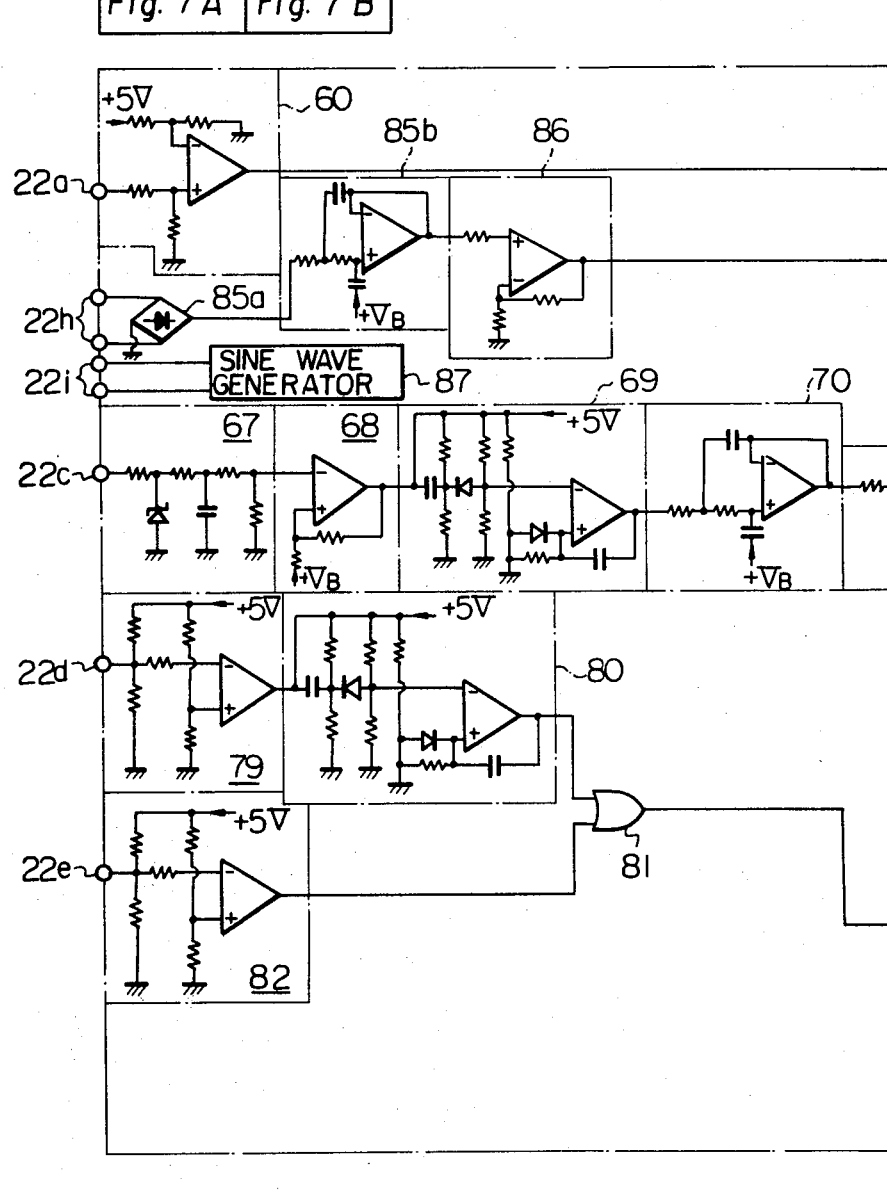
FIGS. 7a and 7b are a detailed circuit diagram of the control circuit illustrated in FIG. 6.
Figure 7B:
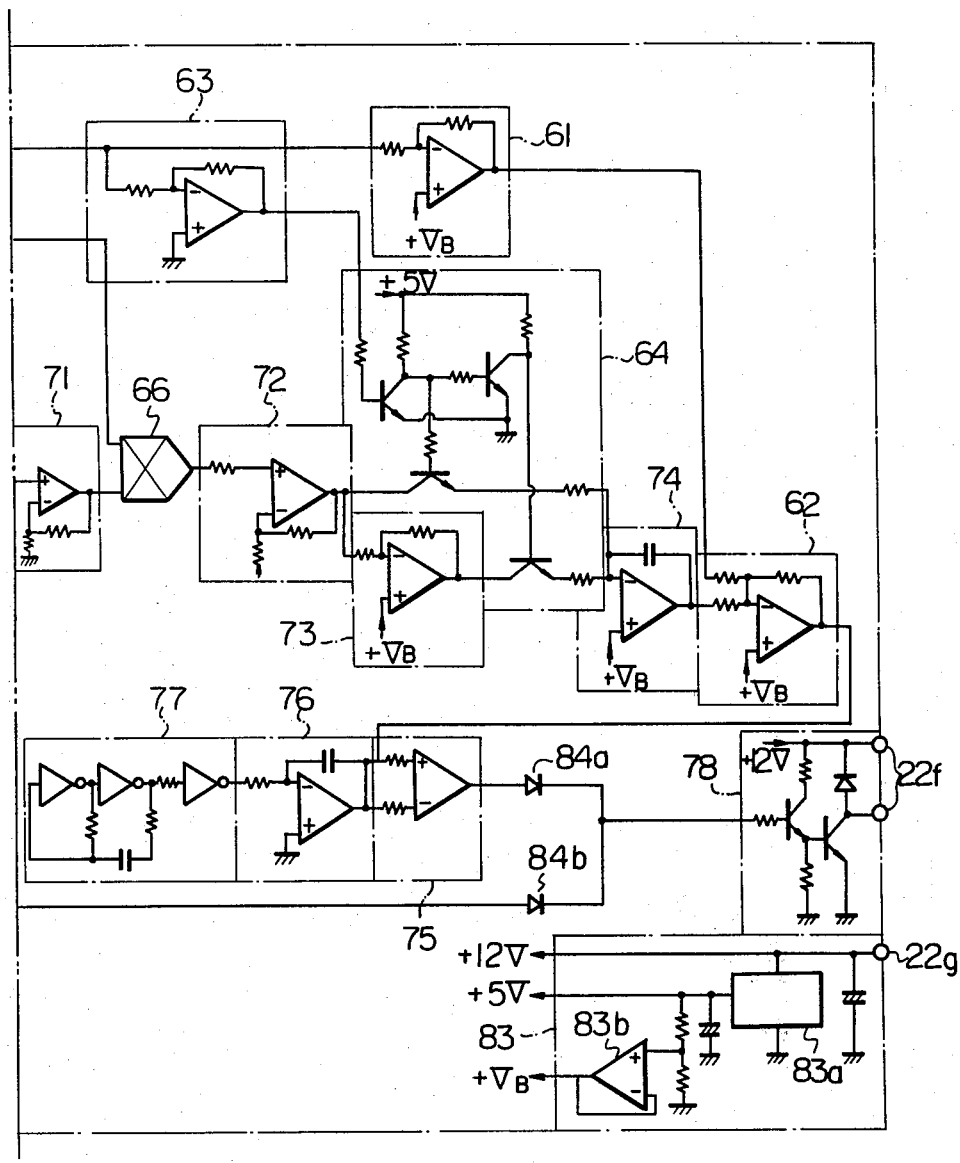

In an apparatus for controlling the amount of secondary air fed into an internal combustion engine according to the present invention, another vacuum level sensor 18', shown in FIG. 3a, can be used. FIGS. 6 and 7 are respectively a block diagram and a detailed circuit diagram illustrating the control circuit 22' of the secondary air control apparatus, wherein this vacuum level sensor 18' is employed. The control circuit 22' has the same structure and function as that of the control circuit 22 illustrated in FIGS. 4 and 5, except for the circuit structure of a load signal generating state for generating an electrical signal which indicates the load of the engine. Therefore, the structure and function of only this load signal generating stage of the control circuit 22' is hereinafter explained.

As illustrated in FIGS. 6 and 7, the detecting coil 53 is connected to the input terminal of a wave converting circuit 85 through input terminals 22h. The output terminal of the wave converting circuit 85 is connected to one input terminal of the multiplier 66 through an amplifier 86. The exciting coil 52 of the vacuum level sensor 18' is connected to the output terminal of a sine wave generator 87 through input terminals 22i.

The sine wave generator 87, which, can be easily constructed from a well-known oscillator, such as a Wien bridge type CR oscillator, generates a sine wave signal which is applied to the exciting coil 52 of the vacuum level sensor 18'.

As described hereinbefore, a sine-like wave voltage having a peak to peak level which is inversely proportional to the level of the vacuum pressure in the intake passage downstream of the throttle valve is induced across the detecting coil 53 of the vacuum level sensor 18'. This sine-like wave voltage is applied to the wave converting circuit 85, which is composed of a rectifying circuit 85a and a smoothing circuit 85b, and thereby converted into a d.c. voltage. Therefore, the level of the output signal from the wave converting circuit 85 is almost inversely proportional to the level of the above-mentioned vacuum pressure, in other words, proportional to the load level of the engine. This output signal from the wave converting circuit 85 is applied to one of two input terminal of the multiplier 66, and thereafter, the same operation as the aforementioned embodiment of FIGS. 4 and 5 is carried out.

As will be apparent from the foregoing description, the apparatus for controlling the amount of secondary air fed into the engine according to the present invention includes: means for generating an intake air amount signal of a value corresponding to the porduct of the value of a speed signal, which indicates the rotational speed of the engine, and the value of a load signal, which indicates the load of the engine; means for generating an integral signal by integrating the intake air amount signal, in an integral direction corresponding to a level of an air-fuel ratio signal, which indicates an equivalent air-fuel ratio condition of the engine, and; means for controlling the level of the actuating pressure applied to the means for controlling the amount of secondary air fed into the engine, in accordance with the level of the integral signal. Therefore, the equivalent air-fuel ratio of of the engine is not rapidly controlled when the level of the output signal of the air-fuel ratio sensor changes. As a result, excessive control of the equivalent air-fuel ratio can be prevented. Namely, the equivalent air-fuel ratio can be more precisely controlled without causing the over-controlling phenomenon. Furthermore, since the response speed of the secondary air flow control means is controlled in accordance with the amount of the air sucked into the engine, the equivalent air-fuel ratio can be controlled precisely in response to changes in the operating condition of the engine, such as acceleration, without delay.

Accordingly, the purifying efficiency of the three-way catalytic converter can be remarkably improved. Furthermore, the apparatus according to the present invention is advantageous in that its structure is very simple and its manufacturing cost is very low.

In the above embodiment, the present invention is adopted to an internal combustion engine having a carburetor. However, it will be readily understood that this invention can also be adapted to an internal combustion engine of an electronic fuel injection type.

As many widely different embodiments of the present invention may be constructed without departing from the spirit and scope of the present invention, it should be understood that the presente invention is not limited to the specific embodiments described in this specification, except as defined in the appended claims.

What is claimed is:

1. An apparatus for controlling the amount of secondary air fed into an internal combustion engine, comprising:
   means for generating a first electrical signal having a value which indicates an equivalent air-fuel ratio condition of said engine;
   means for generating a second electrical signal having a value which indicates the rotational speed of said engine;
   means for generating a third electrical signal having a value which indicates the load of said engine;
   means for generating a fourth electrical signal having a value corresponding to the product of the value of said second electrical signal and the value of said third electrical signal;
   means for generating a fifth electrical signal by integrating the value of said fourth electrical signal, the integral direction of said fifth electrical signal being determined by the value of said first electrical signal;
   means for controlling the amount of secondary air to be fed into said engine in accordance with the level of an actuating pressure applied thereto, and;
   means for controlling the level of the actuating pressure applied to said secondary air amount control means, in accordance with the value of said fifth electrical signal.

2. An apparatus for controlling the amount of secondary air fed into an internal combustion engine as claimed in claim 1, wherein said apparatus further comprises means for generating a sixth electrical signal proportional to the value of said first electrical signal and means for compensating said fifth electrical signal by adding said sixth electrical signal thereto, said actuating pressure control means being controlled in accordance with the value of said compensated fifth electrical signal.

3. An apparatus for controlling the amount of secondary air fed into an internal combustion engine as claimed in claim 1, wherein said actuating pressure control means includes means for generating pulse signals with a duration proportional to the value of said fifth electrical signal, and means for selectively connecting said secondary air amount controlling means to an actuating pressure source or the atmosphere in response to said pulse signals.

4. An apparatus for controlling the amount of secondary air fed into an internal combustion engine as claimed in claim 3, wherein said selective connection means is composed to an electromagnetic valve of three port type, which is intermittently energized by said pulse signals.

5. An apparatus for controlling the amount of secondary air fed into an internal combustion engine as claimed in claim 1, wherein said secondary air amount control means includes means for injecting secondary air into said engine when the level of said actuating pressure is higher than a predetermined value.

6. An apparatus for controlling the amount of secondary air fed into an internal combustion engine as claimed in claim 5, wherein said engine has an air pump for driving secondary air, and wherein said secondary air injecting means comprises an air flow control valve for controlling the amount air fed from said air pump to said engine.

7. An apparatus for controlling the amount of secondary air fed into an internal combustion engine as claimed in claim 1, wherein said first electrical signal generating means comprises an air-fuel ratio sensor for selectively generating an electrical signal having two voltage levels in response to the concentration value of a predetermined consituent gas in said exhaust gas, and a comparator for comparing the level of said generated electrical signal of said air-fuel ratio sensor with a predetermined reference voltage.

8. An apparatus for controlling the amount of secondary air fed into an internal combustion engine as claimed in claim 1, wherein said engine has means for generating a crank angle signal each time the crank shaft of said engine turns a predetermined number of degrees, and wherein said second electrical signal generating means comprises means for converting the frequency value of said crank angle signal into the voltage signal having a value which indicates the rotational speed of said engine.

9. An apparatus for controlling the amount of secondary air fed into an internal combustion engine as claimed in claim 8, wherein said converting means comprises a pulse generating circuit for generating a pulse signal having a predetermined pulse, width, in response to said crank angle signal, and a smoothing circuit for smoothing said pulse signal from said pulse generating circuit to generate the d.c. voltage signal having a value which indicates the rotational speed of said engine.

10. An apparatus for controlling the amount of secondary air fed into an internal combustion engine as claimed in claim 1, wherein said engine has an intake passage and a throttle valve disposed in said intake passage, wherein said third electrical signal generating means comprises a vacuum level sensor for generating an electrical signal having a value which indicates the level of vacuum at a position in said intake passage located downstream of said throttle valve.

11. An apparatus for controlling the amount of secondary air fed into an internal combustion engine as claimed in claim 10, wherein said vacuum level sensor comprises a diaphragm forming a vacuum chamber communicated with said intake passage at a position downstream of said throttle value, a rod connected with and moved with said diaphragm, and a variable resistor connected to said rod for changing the resistance value between the terminals thereof in accordance with the displacement of said rod.

12. An apparatus for controlling the amount of secondary air fed into an internal combustion engine as claimed in claim 10, wherein said vacuum level sensor comprises a diaphragm forming a vacuum chamber communicated with said intake passage at a position downstream of said throttle value, a rod connected with and moved with said diaphragm, and a magnetic transducer connected to said rod for generating a voltage signal having a level corresponding to the displacement of said rod.

13. An apparatus for controlling the amount of secondary air fed into an internal combustion engine as claimed in claim 1, wherein said engine has an intake manifold, and wherein said actuating pressure includes a negative pressure applied from said intake manifold.

14. An apparatus for controlling the amount of secondary air fed into an internal combustion engine as claimed in claim 1, wherein said engine has an air pump for driving secondary air, and wherein said actuating pressure includes a positive pressure applied from said air pump.

15. An apparatus for controlling the amount of secondary air fed into an internal combustion engine as claimed in claim 1, wherein said engine has at least one throttle valuve, and wherein said apparatus further comprises means for generating a seventh electrical signal having a value which indicates that the opening degree of said throttle valve is higher than a predetermined value, and means for rapidly increasing the actuating pressure to said secondary air amount controlling means, in response to said seventh electrical signal.

16. An apparatus for controlling the amount of secondary air fed into an internal combustion engine as claimed in claim 1, wherein said apparatus further comprises means for generating an eighth electrical signal having a predetermined value which indicates that the value of the temperature of said engine is lower than a predetermined value, and means for applying the actuating pressure to said secondary air amount controlling means when said eighth electrical signal is applied thereto.

* * * * *

UNITED STATES PATENT AND TRADEMARK OFFICE
CERTIFICATE OF CORRECTION

PATENT NO. : 4,224,911
DATED : 9/30/80
INVENTOR(S) : Tadao Mitsuda, Minoru Iwata and Masatoshi Sugiura It is certified that error appears in the above—identified patent and that said Letters Patent is hereby corrected as shown below:

Col. 3, line 23, change "einge" to --engine--.

Col. 3, line 59, change "exiciting" to --exciting--.

Col. 3, lines 63-64, change "exciling" to --exciting--.

Col. 5, line 38, change "an" to --a--.

Col. 8, line 12, change "Comtrary" to -- Contrary --.

Col. 8, line 57, change "deviding" to --dividing--.

Col. 8, line 61, after "now" insert --be--, after "referring" insert --to--.

Col. 8, line 65, change "votational" to --rotational--.

Col. 8, line 68, after "of" insert --the--.

Col. 11, lines 43-44, change "appearent" to --apparent--.

Col. 11, lines 66-67, change "operating" to --opening--.

Col. 12, line 2, change "ration" to --ratio--.

Col. 12, line 42, change "as" to --so--.

Col. 12, line 66, change "state" to --stage--.

Col. 13, line 37, change "porduct" to --product--.

Col. 14, line 6, change "presente" to --present--.

UNITED STATES PATENT AND TRADEMARK OFFICE
CERTIFICATE OF CORRECTION

PATENT NO. : 4,224,911

DATED : 9/30/80

INVENTOR(S) : Tadao Mitsuda, Minoru Iwata and Masatoshi Sugiura

It is certified that error appears in the above—identified patent and that said Letters Patent is hereby corrected as shown below:

Col. 14, line 60, change "to" to --of--.

Col. 15, line 6, after "amount" insert --of--.

Col. 15, line 14, change "consituent" to --constituent--.

Col. 16, lines 2 and 12, in both occurrences, change "value" to -- valve--.

Col. 16, line 31, change "valuve" to --valve--.

Signed and Sealed this

Third Day of February 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,224,911
DATED : 9/30/80
INVENTOR(S) : Tadao Mitsuda, Minoru Iwata and Masatoshi Sugiura It is certified that error appears in the above—identified patent and that said Letters Patent is hereby corrected as shown below:

On The Title Page, Item (73), should read

Assignee: Toyota Jidosha Kogyo Kabushiki Kaisha
and Aisan Industry Co., Ltd.

Signed and Sealed this

Ninth Day of June 1981

[SEAL]

*Attest:*

RENE D. TEGTMEYER

*Attesting Officer*      *Acting Commissioner of Patents and Trademarks*